United States Patent Office 3,264,687
Patented August 9, 1966

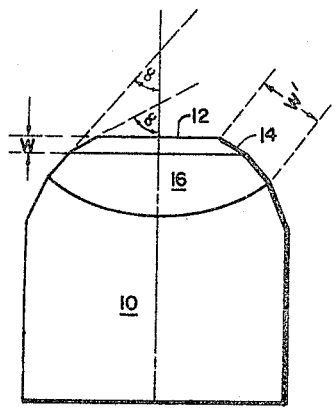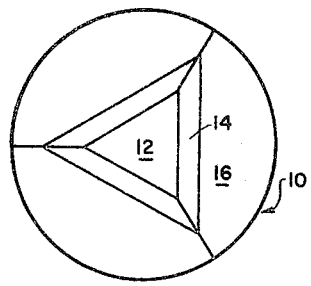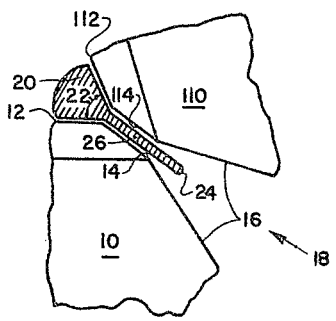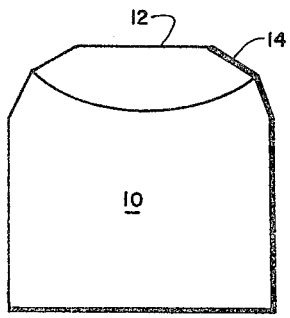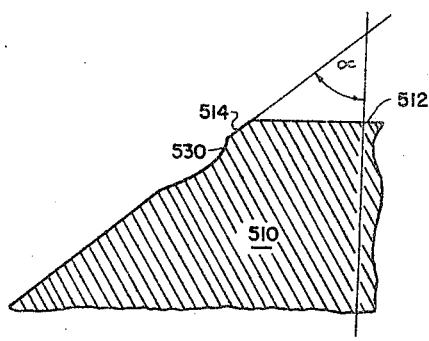
RICHARD D. POTTER
*INVENTOR.*
BY Charles M Woodward
ATTORNEY

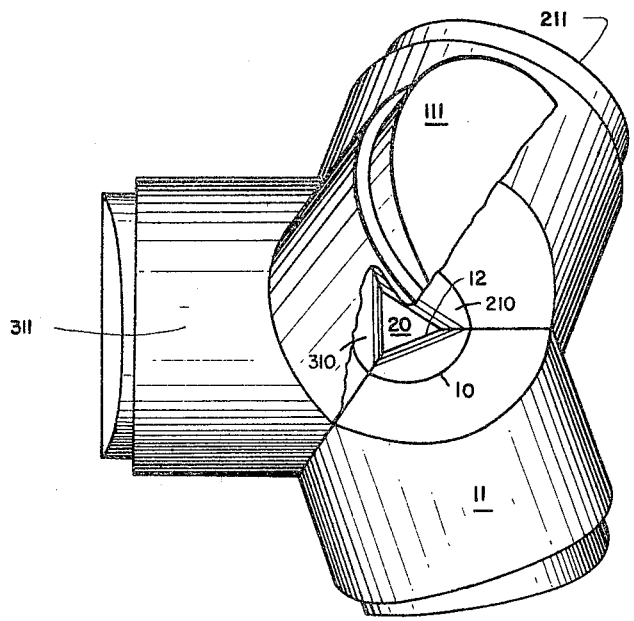

3,264,687
CONSTANT AREA ULTRAHIGH PRESSURE
ANVIL SYSTEM
Richard D. Potter, Fort Worth, Tex., assignor to General Dynamics Corporation, Fort Worth, Tex., a corporation of Delaware
Filed May 24, 1965, Ser. No. 457,947
4 Claims. (Cl. 18—16)

The present invention relates generally to ultrahigh pressure anvil systems.

More specifically, it pertains to a high pressure anvil configuration wherein the area of the workface acting against the workpiece being compressed remains constant.

A long existent problem in compaction of materials in ultrahigh pressure devices, i.e., devices capable of exerting pressures of 40 kilobars and higher, has been the characteristic flowing of the material during compaction between the non-workfaces of the pressure anvils.

In ultrahigh pressure equipment, normally, a plurality of tetrahedral anvils are arranged so that a void of gradually diminishing volume of tetrahedron shape is formed between the anvil faces. As these anvils approach one another, the material of the sample or workpiece is extruded between the anvils. There are two basic reasons for such extrusion. Primarily, of course, the workpiece must be oversize to begin with (in relation to the cavity) for it to be compressed by any substantial amount. Since the pressure exerting devices are not contiguous with one another until the limit of their travel is reached, the material will by nature flow or extrude. Secondly, some extrusion is both desirable and necessary in that it is required to form a gasket in order to retain the workpiece under compressive pressure as the anvil pressure increases. This is occasioned by the extruding material or web becoming longer and thinner and eventually, depending on the material, the anvils, and the web surface conditions, the internal and surface friction of the webs tends to resist the extruding action and functions as a pressure gasket.

However, once this pressure gasket is formed, the further increase in area of the web tends to become detrimental, since the increase in length of the web material being extruded increases the area of the web exposed to the anvil force. This increasing area is acted upon by the anvil and absorbs a good part of the force being exerted by the anvil, thus materially decreasing the pressure exerted against the workpiece. Such result is obviously deleterious to achieving the pressure desired. Eventually, these webs create so much area against which the anvils act that little, if any, pressure is exerted on the workpiece, that is, the system becomes web-locked.

The present invention eliminates the undesirable features of the extruded web, yet retains the self-pressure gasketing function thereof. This result is accomplished by providing an anvil configuration which maintains a constant area regardless of the amount of material extruded, thus obviating the deficiencies of the present ultrahigh pressure system state of the art. Yet this result is achieved in an economical and readily obtainable manner. It is therefore an object of this invention to provide an improved ultrahigh pressure system.

It is a further object to provide an anvil for an ultrahigh pressure device which has a constant, determined work area.

Other and further objects and advantages will be apparent to those versed in the art from a consideration of the following detailed specification and drawings, wherein:

FIGURE 1 is an elevational view of an anvil, constructed according to the present invention;
FIGURE 2 is a plan view of the device of FIGURE 1;
FIGURE 3 is a perspective view for orientation purposes of an anvil system, a portion thereof being broken away for clarity;
FIGURE 4 is a partial elevational view of two opposing anvils of the present invention having a workpiece therebetween;
FIGURE 5 is a partial, elevational view of an alternative embodiment of the anvil of the present invention similar to FIGURE 1; and
FIGURE 6 is an elevational view of an anvil of the present state of the art.

Referring now to FIGURES 1 and 2, the ultrahigh pressure anvil of the present invention comprises a body member or insert 10, which may be of the material disclosed in my copending application Serial No. 439,036, filed March 11, 1965. This insert 10 is, in use, encased in an anvil jacket 11 (shown in FIGURE 3 and referenced for purposes of clarity as 11, 111, 211 and 311). Insert 10 has a triangular workface 12, a first web area or first side face 14 surrounding workface 12, and second web area or second side face 16. Since, in application, each anvil (as hereinafter employed, the term anvil is understood to include the insert 10 and jacket 11) forms a component of an anvil system, as seen in FIGURE 3, comprising four anvils spaced 120° apart, which are driven together (inwardly) on axes perpendicular to the four faces of the tetrahedron sample 20, the angle between two adjacent anvil faces (such as 12 and 112 of FIGURE 4) is the same as the wedge angle 22 between the two adjacent faces of tetrahedron sample 20, or about 70°32′.

Thus, for the four anvils of FIGURE 3, to come together, the sides of the anvils must diverge from the face 12 at an angle such as to bisect the tetrahedron wedge angle, or about 54° 44′ relative to the longitudinal axis of the anvil. Thus, between these four anvils there are six common side faces 14 along or between which the extruding webs are formed. Thus, each anvil has three side faces 14 (FIGURES 1 and 2) diverging from the workface 12 at an angle of 54°44′.

In the present state of the art, this divergence is uniform, as shown in FIGURE 6, and susceptible to the web-locking disability previously explained due to the constant contact of the side faces with the extruding web, which become thinner but comprise ever enlarging areas.

The present invention solves this problem by limiting the web area in contact with each anvil. One such solution is shown in FIGURES 1, 2 and 4. As therein shown, each anvil has workface 12 (112), first side faces 14, and second side faces 16 extended from faces 14 but at a slightly lesser angle, in respect to the central axis, than face 14. Thus, at a distance "w" from the edge of the tetrahedral face 12, the angle of slope is increased (with respect to face 14), permitting an expanded or diverging gap 18 (FIGURE 4) to be formed between the opposing faces 16 in an anvil system. As seen in FIGURE 4, during the initial inward movement of the anvils a web 24 is extruded from workpiece 20 between first side faces 14–114, thus forming the pressure gasket 26 previously mentioned as desirable. But once having formed such gasket, the extruding web 24 passes the junction between the first and second side faces and enters the diverging gap 18, thus no longer being restricted between the anvils and consequently no longer increasing in contact area or resistance to anvil movement. The distance "w," or width, of first face 14 is dependent upon the type and nature of the workpiece 20, surface conditions of the anvils, rate of pressure rise in the workpiece, and ultimate pressures involved. Because of the variable circumstances involved in determining the ideal value or dimension, the most expedient method for such determination is a few experimental runs with the particular material to be used, or a representative material. As an example, a good median value in our experiments has been 0.100 inch for "$w$," with a decreased angle between faces 14–16 of 10°, thus giving the first side face 14 an angle $\alpha$, measured from the anvil axis, of 54°44′, and the second side face 16 an angle $\alpha'$ of 44°44′.

By further way of example, "$w$" increases generally as the sample material becomes softer, as desired ultimate pressures become higher, and as the surface of 14 becomes more polished. For obvious reasons, it is desirable to have surface 14 not highly polished for most applications. A smaller "$w$" is advantageous when the sample material is work hardenable. Thus, "$w$" should be large enough to cause a pressure gasket 26 to be formed from the extruding web 24 of the workpiece 20, but not large enough to materially increase the area of the workpiece being reacted against, i.e., the less area formed by the web, the less pressure will be lost to the workpiece.

Generally, for small distances "$w$"—that is, less than or equal to "$w'$" (as seen in FIGURE 1), the resulting maximum contact area of web per anvil will be three times the area of the trapezoid (first side faces 14) exposed.

The modified angle of slope $\alpha'$ forming the relief area or diverging gap 18 must, of necessity, be a compromise between overly weakening the anvil by lack of massive support and the entrapment of the web to be extruded. The above example has been found to be a convenient value for most purposes, but may obviously be modified or changed to meet specific circumstances without departing from the scope of the invention.

FIGURE 5 is illustrative of one possible modification which may be readily performed on existing anvils having body 510 and workface 512. As therein shown, rather than making separate faces 16, as previously described, a relief area 530 is provided at the edge of face 514 which accomplishes the same result as the second face 16 of the first embodiment. Obviously, once having formed a pressure gasket across face 514, the extruding web is unconfined in relief area 530.

Thus, there has been provided an improved ultrahigh pressure anvil device which obviates the problems of the prior art devices in a simple, yet highly efficient manner, yet at the same time retains all the advantages of the prior art. The invention is accomplished by providing an anvil with a constant web area of known dimensions which will not react against opposing anvils to any greater extent than that requisite to form a pressure gasket around the material being worked.

What is claimed is:
1. An anvil for ultrahigh pressure anvil systems comprising:
    A. a workface;
    B. side faces positioned adjacent said workface in angular relationship thereto and operative to cause a material extruded therebetween by like opposing anvil members to function as a pressure gasket;
    C. a relief area continuous to said side faces, said relief area spaced from said workface to limit the area defined by said side faces to the distance required to form a pressure gasket between like opposing side faces, said relief area in co-operative relationship to said side faces to permit extruded material to be unconfined beyond the pressure gasket on application of opposing anvil members having like configurations.

2. An apparatus for subjecting an article in the form of a tetrahedron to ultrahigh pressures, comprising:
    A. pressure exerting anvil members movable inwardly simultaneously perpendicularly to the corresponding faces of the tetrahedral article;
        (1) said anvil members in operative combination defining a progressively diminishing tetrahedron between the workfaces thereof and having a void space defined between adjacent cooperative side faces thereof operative to receive extruded material from the sample;
        (2) said opposing side faces having a first portion thereof parallel to one another and operative to cause the article extruded material to function as a pressure gasket on inward movement of said anvil members, and
        (3) a relief area spaced from the tetrahedral article pressure exerting faces by said first side faces, and defined by non-parallel side portions at least in part divergent one from the other and operative to receive excess extruded workpiece material in a substantially unconfined relationship.

3. The apparatus as defined in claim 2 wherein said side face first portion defines an angle of 54°44′ with respect to the longitudinal axis of said anvil, and said non-parallel side portions define an angle of about 44° to about 50° with respect to the longitudinal anvil axis.

4. The apparatus as defined in claim 2 wherein said side face first portion defines an included angle with the anvil longitudinal axis, and said non-parallel side portions constitute a dished groove whose initial angle with respect to the plane of said first side portion is about 30°.

References Cited by the Examiner

UNITED STATES PATENTS

| | | | |
|---|---|---|---|
| 806,472 | 12/1905 | Jefrey | 18—42 |
| 2,607,080 | 8/1952 | Stewart | 18—42 |
| 2,730,766 | 1/1956 | Tompkins | 18—42 |
| 2,918,699 | 12/1959 | Hall. | |
| 2,941,252 | 6/1960 | Bovenkerk. | |
| 3,088,170 | 5/1963 | Strong. | |
| 3,150,413 | 9/1964 | Zeitlin et al. | |

WILLIAM J. STEPHENSON, *Primary Examiner.*